United States Patent
Hugosson (10) Patent No.: US 8,676,027 B2
(45) Date of Patent: Mar. 18, 2014

(54) METHOD FOR EVENT INITIATED VIDEO CAPTURING AND A VIDEO CAMERA FOR CAPTURE EVENT INITIATED VIDEO

(75) Inventor: Fredrik Hugosson, Lomma (SE)

(73) Assignee: Axis AB, Lund (SE)

( * ) Notice: Subject to any disclaimer, the term of this patent is extended or adjusted under 35 U.S.C. 154(b) by 193 days.

(21) Appl. No.: 13/183,942

(22) Filed: Jul. 15, 2011

(65) Prior Publication Data

US 2012/0014659 A1 Jan. 19, 2012

(30) Foreign Application Priority Data

Jul. 16, 2010 (EP) ..................................... 10169879

(51) Int. Cl.
*H04N 5/77* (2006.01)

(52) U.S. Cl.
USPC ........................................... 386/228; 386/229

(58) Field of Classification Search
None
See application file for complete search history.

(56) References Cited

U.S. PATENT DOCUMENTS

| | | | |
|---|---|---|---|
| 2002/0163577 A1 | 11/2002 | Myers | |
| 2006/0177119 A1 * | 8/2006 | McPheely et al. | ............ 382/141 |
| 2006/0221184 A1 | 10/2006 | Vallone et al. | |
| 2007/0217761 A1 * | 9/2007 | Chen et al. | ....................... 386/86 |
| 2009/0207247 A1 | 8/2009 | Zampieron et al. | |
| 2009/0219392 A1 | 9/2009 | Roskowski | |
| 2009/0225163 A1 | 9/2009 | Chathukutty et al. | |

FOREIGN PATENT DOCUMENTS

| | | |
|---|---|---|
| EP | 0898770 A1 | 3/1999 |
| WO | 9627864 A1 | 9/1996 |
| WO | WO 99/56216 | 11/1999 |
| WO | WO 01/35668 | 5/2001 |

* cited by examiner

*Primary Examiner* — Heather Jones
(74) *Attorney, Agent, or Firm* — Volpe and Koenig, P.C.

(57) ABSTRACT

A method and a video camera for recording an event initiated video sequence includes storing captured video frames in a video buffer, detecting a first event, and in response, initiating a video sequence recording session for recording of a video sequence in a non-volatile memory. Pre-event video frames and post-event video frames related to the first event are recorded, where the post-event time period starts at the detection of the first event. A first event delay time period is started in response to the expiration of the post-event time period. The video sequence recording session is closed if a delay period expires and no other event process is in progress.

14 Claims, 10 Drawing Sheets

METHOD FOR EVENT INITIATED VIDEO CAPTURING AND A VIDEO CAMERA FOR CAPTURE EVENT INITIATED VIDEO

TECHNICAL FIELD OF THE INVENTION

The present invention relates to systems or cameras used in recording video sequences relating to specified events. More particularly the invention relates to a method for generating an event initiated video sequence and a video camera arranged for event initiated recording of video sequences.

BACKGROUND OF THE INVENTION

Video camera systems are widely used for capturing video images for surveillance purposes in offices, banks, in parking lots, on the streets, in homes etc. or for monitoring purposes in a production line or similar. However, recordings from such camera systems may include one single interesting event representing a few seconds among hours of video that is of no particular interest at all. Hence, there are a couple of problems with such systems. It is for instance very difficult to find a relatively short event of interest in a very long video recording. Moreover, the recording of all video requires a lot of storage space. Therefore, many monitoring and surveillance video cameras is arranged to detect events or be triggered by an external signal indicating an event. This extra information is in some implementations used to indicate where in the vast video recording the events of interest are positioned. In other implementations these events triggers the recording of the video of the event. For some events the video following after the event is of most interest, for other events the video preceding the event is of most interest, and for yet other events it is a combination of the above that are of most interest. Hence a relatively small sized file or stream of video is generated and is transmitted for remote storing in relation to each event detection.

Moreover, a video camera may be arranged to detect a plurality of different events resulting in an increased risk of events detected in a video camera occurring simultaneously and thereby resulting in two files or streams including at least some identical video image frames and thereby using up additional storage space or bandwidth.

In EP0898770, an event capturing method is described. The method discloses a video camera and a video card capturing video images. The video images are buffered by a processor, which makes files of a predetermined size of the buffered images and stores these files in a working storage. The files are stored in a circular fashion in the working storage (i.e., the newest file replaces the oldest) until an event is detected. Then the file including the event and later post-event files are stored sequentially in the working storage. Once the recording of a video image file containing the event is completed, the file containing the event is renamed to identify it as a file which contains an event ("e.g., 100400EV.EXT"). The event capturing system then continues recording video images until the total number of post-event files, as defined by the user during setup, have been recorded. Each of these event and post-event files may contain video from more than one event. Upon completion of the recording of all post-event files, the event files (i.e., the renamed files) are all tagged and identified for storage in permanent storage.

SUMMARY OF THE INVENTION

The present invention provides an improved method and an improved camera for event initiated video capturing.

In particular, according to a first aspect of the present invention, a method means for recording an event initiated video sequence comprises continuously capturing video frames, temporarily storing video frames in a video buffer, detecting a first event, initiating, in response to the detection of the first event, a video sequence recording session for recording of a video sequence in a non-volatile memory, recording in the non-volatile memory pre-event frames of the captured video data present in the buffer. This recording is performed in response to the detection of the first event, recording in the non-volatile memory post-event frames of the video data captured during a post-event time period related to the first event. The post-event time period starts at the detection of the first event, ranging a number of post-event frames and starts a first event delay time period in response to the expiration of the post-event time period of the first event. A second event is detected after expiration of the post-event time period of the first event and before expiration of the first event delay time period. In response to detection of the second event, recording in the non-volatile memory frames from the video buffer representing a time period starts at the expiration of the post-event time period of the first event and ends at the detection of the second event. Recording in the non-volatile memory frames of the video data is captured during a post-event time period related to the second event, the post-event time period starting at the detection of the second event and ranging a number of post-event frames. If a delay period expires and no other event process is in progress, the video sequence recording session is closed. An event process includes recording pre-event frames, recording post-event frames, and an event delay time period, and the delay period is a period counted from the expiration of a post-event time period.

By introducing an event delay timer and making this timer control the closing of the recording session, it becomes possible to effectively store event initiated video sequences because this procedure enables the camera to record different events without recording duplicate video frames, even when the event requires recording of pre-event video frames, (i.e., video frames representing the scenery of a time period preceding the detection of the event).

According to one embodiment, the size of the video buffer substantially corresponds to a maximal number of pre-event frames. As such, the size of the memory in which the buffer resides may be small. Thereby, the cost and the overall size of the camera may be reduced.

According to another embodiment, the predetermined number of pre-event frames is defined by at least two parameters, wherein the first parameter is an arbitrary value defining the desired amount of video preceding the event, and the second parameter is a latency period corresponding to the time difference between an occurrence of an event and a detection of the same event. By considering the latency of the detection process, as well as the time period the event is required to record, the size of the pre-event recordings may be made very accurate and thereby the size of the required buffer memory may be determined more exactly.

According to yet another embodiment, the video buffer is of First In First Out (FIFO) type.

In one embodiment, the act of initiating a video sequence recording session comprises the act of setting up a file in the non-volatile memory to include the recorded video session wherein the act of closing the video sequence recording session includes the act of closing the file.

In another embodiment, the acts of capturing video frames, temporarily storing video frames in a video buffer, detecting a first event, initiating a video sequence recording session, recording pre-event frames of the first event, recording post-event frames of the first event, detecting a second event, recording pre-event frames of the second event, recording post-event frames of the second event, and closing the video sequence recording session all are performed at a camera.

According to one embodiment, the non-volatile memory is arranged in a camera.

According to another embodiment, the buffer is arranged in a camera and the non-volatile memory is arranged in a device connecting to the camera via a network, wherein the act of initiating a video sequence recording session includes the act of setting up a video stream over the network and a file in the non-volatile memory to transfer the video stream over the network and store the recorded video session in the file, and wherein the act of closing the video sequence recording session comprises the act of closing the file and the video stream. By applying the method in a system recording over a network, the method is further advantageous in that it saves bandwidth.

According to yet another embodiment a detected event may be of any event type of a plurality of event types, wherein the method further comprises indicating the event type of any detected event and retrieving values specifying the predetermined number of pre-event frames the predetermined number of post-event frames of the indicated event type.

According to a second aspect of the invention, a video camera arranged for event initiated capturing of video sequences includes an image sensor arranged to continuously capture video frames, a video buffer arrange to temporarily store video frames, an event detector, a video sequence recording session initiator arranged to initiate, in response to a detection of an event, a video sequence recording session for recording of a video sequence in a non-volatile memory, and a pre-event recorder arranged to record in the non-volatile memory a number of pre-event frames of the captured video data present in the buffer. The pre-event recorder is further arranged to perform the recording in response to the detection of the first event. The video camera also includes a post-event recorder arranged to record, in the non-volatile memory, post-event frames of the video data captured during a post-event time period related to the detected event. The post-event time period starts at the detection of the event and ranges a predetermined number of post-event frames. An event delay timer times an event delay time period starting at a point in time of an expiration of a post-event time period. A video sequence recording session closer closes the video sequence recording session if a delay period expires and no other event process is in progress. An event process includes recording pre-event frames, recording post-event frames, and an event delay time period.

According to one embodiment of the second aspect, the size of the video buffer substantially corresponds to a maximal number of pre-event frames. As such, the size of the memory in which the buffer resides may be small. Thereby, the cost and the overall size of the camera may be reduced.

According to another embodiment the number of pre-event frames is defined by at least two parameters, wherein the first parameter is an arbitrary value defining the desired amount of video preceding the event and the second parameter is a latency period corresponding to the time difference between an occurrence of an event and a detection of the same event. By considering the latency of the detection process as well as the time period the event is required to record, the size of the pre-event recordings may be made very accurate. Thereby, the size of the required buffer memory may be determined more exactly.

According to yet another embodiment, the video buffer is a FIFO type.

In another embodiment, the video sequence recording session initiator is further arranged to set up a file in the non-volatile memory to include the recorded video session, wherein the video sequence recording session closer is further arranged to close the file.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of embodiments, with reference to the accompanying drawings, in which.

DETAILED DESCRIPTION OF EMBODIMENTS

Below a detailed description of embodiments is disclosed referring to the drawings in which like numerals indicates the same or similar features.

Figure 1:
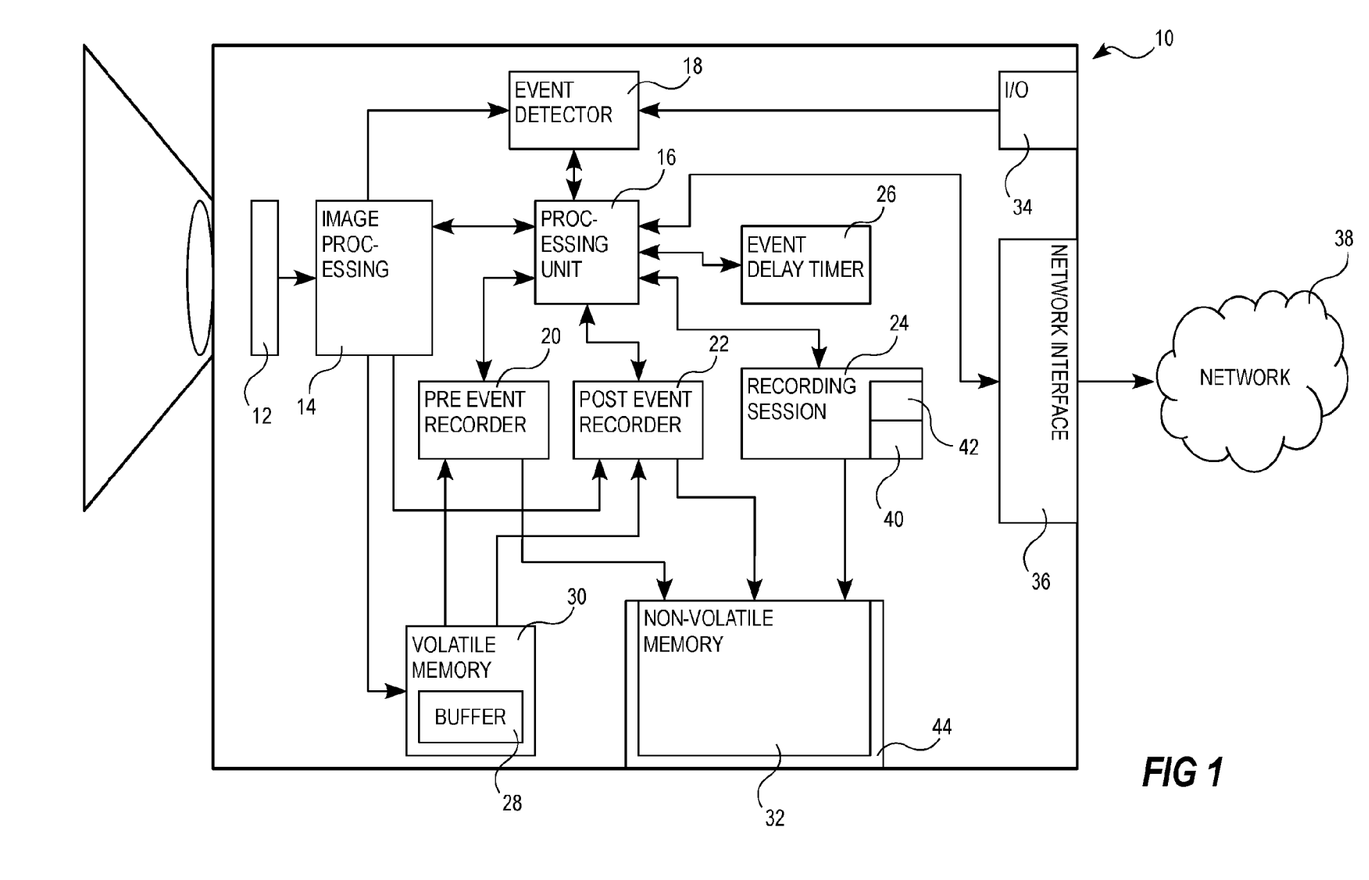
FIG. 1 is a schematic view of one embodiment of a video camera according to the invention.

In FIG. 1, a video camera 10 implementing one embodiment of the present invention is shown. The video camera 10 includes an image sensor 12, an image processing unit 14, a processing unit 16, an event detector 18, a pre-event recorder 20, a post-event recorder 22, a video sequence recording session processor 24, an event delay timer 26, a buffer 28 arranged in a volatile memory 30, and a non-volatile memory 32. The video camera 10 may also include, as depicted in FIG. 1, an Input/Output interface 34 (I/O-interface) for receiving signals indicating external events, and a network interface 36 connecting the camera to a network 38 for communication with video servers, video clients, control devices, display devices, storage devices etc. The I/O-interface 34 is not necessarily an I/O interface, as many applications only need an input interface arranged to receive signals.

The image sensor 12 is arranged to capture image data and the image processing unit 14 is arranged to process the image data from the image sensor 12. The image sensor 12 and the image processing unit 14 may correspond to known image sensors and known image processing units of available video cameras in which the image processing unit 14 are intended to include known means and devices necessary for outputting a compressed digital stream of video frames. According to one embodiment, the processing unit 16 is also arranged to produce image frames including raw-data.

The processing unit 16 may be a single processing unit or a plurality of processing units arranged to control functions of the camera, e.g., one processor may be arranged to run code implementing particular functionality.

The event detector 18 of this embodiment is designed to check input signals for changes and to determine if the changes correspond to any predetermined events. When such changes to an input signal are determined to correspond to a predetermined event, the event detector indicates that an event is detected. The indication of a detected event may, according to one embodiment, include information identifying the type of event detected. The event detector 18 is arranged to provide the signal indicating a detected event to the processing unit 16. The event detector 18 may be arranged to detect event by analyzing images from the image processing unit 14. Examples of such analysis may be motion detection analysis, crossing a line analysis, facial recognition, tampering, etc. Alternatively, or in addition, the event detector 18 may be arranged to receive an event signal from an external device via the I/O-interface 34. Such event signals may, for instance, be generated by an external IR-detector, a revolution counter, a temperature sensor, a pressure sensor, an audio sensor, a push-button, a sensor means measuring voltage, means measuring current, means measuring power, means measuring network activity, etc. In some applications, one or a plurality of sensors normally arranged externally to the video camera may be embedded in the video camera or at least arranged in the same housing as the video camera. The event detector 18 may also keep an event signal active for as long as the event is in progress (e.g., as long as movement is detected) or as long as the temperature is above a specific level, etc.

The pre-event recorder 20 is arranged to record a video sequence preceding a detected event and being of a predetermined length in a non-volatile memory 32. The pre-event video sequence is retrieved from the buffer 28 in the volatile memory. The pre-event recorder 20 may be arranged to record the entire length of the pre-event video sequence at once or record every frame to be included as it exits the buffer due to a new video frame entering the buffer 28. One reason for recording video from a point in time preceding the event is that actions, occurrences, or incidents happening before the event may be very important in order to correctly interpret the event. The length of the pre-event recording depends on the action detected and the purpose of the monitoring of such events.

The post-event recorder 22 is arranged to record video being registered by the video camera 10 after the detection of the event for a predetermined time or for as long as an event is in progress, e.g., as long as movement is detected. The post-event time period may be defined as a predetermined number of post-event video frames. The post-event recorder 22 may be arranged to retrieve the video frames for recording directly from an output of the image processing unit 14 and to record the retrieved video frames in the non-volatile memory 32. According to another embodiment, the post-event recorder 22 may be arranged to record each video frame of the post-event interval when they are leaving the buffer 28 when becoming old. Thereby the post-event recorder 22 performs a delayed recording of a video frame captured by the sensor a delay time period before the recording, where the delay time period corresponds to the size of the buffer.

The video sequence recording session processor 24 includes a video sequence recording session initiator 40 and a video sequence recording session closer 42. The video sequence recording session processor 24 is arranged to control a video recording session of a continuous video sequence. A video session is started by the video sequence recording session initiator 40 in response to the pre-event recorder 20 requesting recording of a pre-event and is ended by the video sequence recording session closer 42 in accordance with a scheme being based on signals from the delay timer 26, the pre-event recorder 20, and the post-event recorder 22. The scheme may be executed by the processing unit 16.

In the embodiment of FIG. 1, the video sequence recording session initiator 40 may be arranged to setup the non-volatile memory 32 to start storing a continuous video sequence, and the video sequence recording session closer 42 may be arranged to end the storing of the continuous video sequence. For example, the recording session may be seen as the period during which 35 consecutive frames, in view of time, are stored. The setup performed by the video sequence recording session initiator 40 may include opening or initiating a file in a file system of the non-volatile memory 32, or it may include storing video initiation data, e.g., a marker, for identifying the start of the continuous video sequence in the non-volatile memory 32. Other setup schemes are also possible but are not expressly disclosed herein. The ending of the storing of a continuous video sequence may include closing the file opened or initiated by the video sequence recording session initiator 40, or it may include storing video ending data for identifying the end of the continuous video sequence. Other ending schemes are also possible but are not expressly disclosed herein.

The event delay timer 26 is a timer that is triggered when the post-event recorder 22 has recorded all the frames required for the presently handled event. The processing unit 16 considers the state of the event delay timer 26 (e.g., if it has expired or if it is running) when deciding on whether the video sequence recording session is to be closed. The delay value of the timer 26 is, according to one embodiment, predetermined to a value corresponding to the length of the pre-event recording. In case of a plurality of different event types recognized by the camera 10, the delay value is set to correspond to the longest pre-event recording lengths of all of the different event types recognized.

The buffer 28 is arranged in the volatile memory 30 to temporarily store sequential video frames for the purpose of enabling retrieval of previously captured video frames, if necessary. The buffer is therefore implemented as a First In First Out buffer, FIFO-buffer (i.e., a queue).

According to one embodiment, the length of the buffer is at least the same length as the longest pre-event video frame sequence defined for any event type to be detected by the camera. According to another embodiment the buffer is substantially identical to the longest pre-event video frame sequence defined for any event type to be detected by the camera.

The volatile memory 30 is arranged to include the buffer 28 described above and function as temporary storage for the processing unit when operating the camera. The volatile memory may for instance be a Random Access Memory (RAM), (e.g., a Static RAM (SRAM) or a Dynamic RAM (DRAM)).

The non-volatile memory 32 is arranged for long term storage of potentially interesting video sequences and other data that is required or desired to be accessible even after a power failure or after the video camera has not been provided with power during a substantial time period. Hence, the non-volatile memory 32 is a memory that can retain the stored information even when not powered. In this particular embodiment, the non-volatile memory 32 is a rewriteable, non-volatile memory (i.e., a memory that is possible to write and rewrite information to and which still retains stored information when not powered). Examples of such memories include Hard Disk Drives (HDD) having rotating disks, Solid State Drives (SSD), PROM, EPROM, EEPROM, and Flash memory. However, the non-volatile memory 32 may also be a non-rewriteable memory, e.g. CD-ROMS, tapes, etching, etc.

A non-volatile memory 32 may be embedded within the housing of the video camera 10 or connected to the camera via an external interface. The external interface is used in order to allow simple exchange of non-volatile memory 32 and may be a simple connector or arranged in a memory connection slot 44 receiving the non-volatile memory 32. In one embodiment, implementing a memory connection slot 44, the non-volatile memory 32 used may be a CompactFlash (CF), Secure Digital card (SD card), a Memory Stick, etc.

The network interface 36 may be any known network interface enabling the video camera to connect to the network 38 (e.g., a Local Area Network (LAN), a Wide Area Network (WAN), the Internet, etc.).

Any one of, any combination of, or all of the event detector 18, the pre-event recorder 20, the post-event recorder 22, the video sequence recording session unit 24, the event delay timer 26, and the image processing unit 14 may be implemented in software being processed by the processing unit 16 or may be implemented in hardware.

Figure 2:
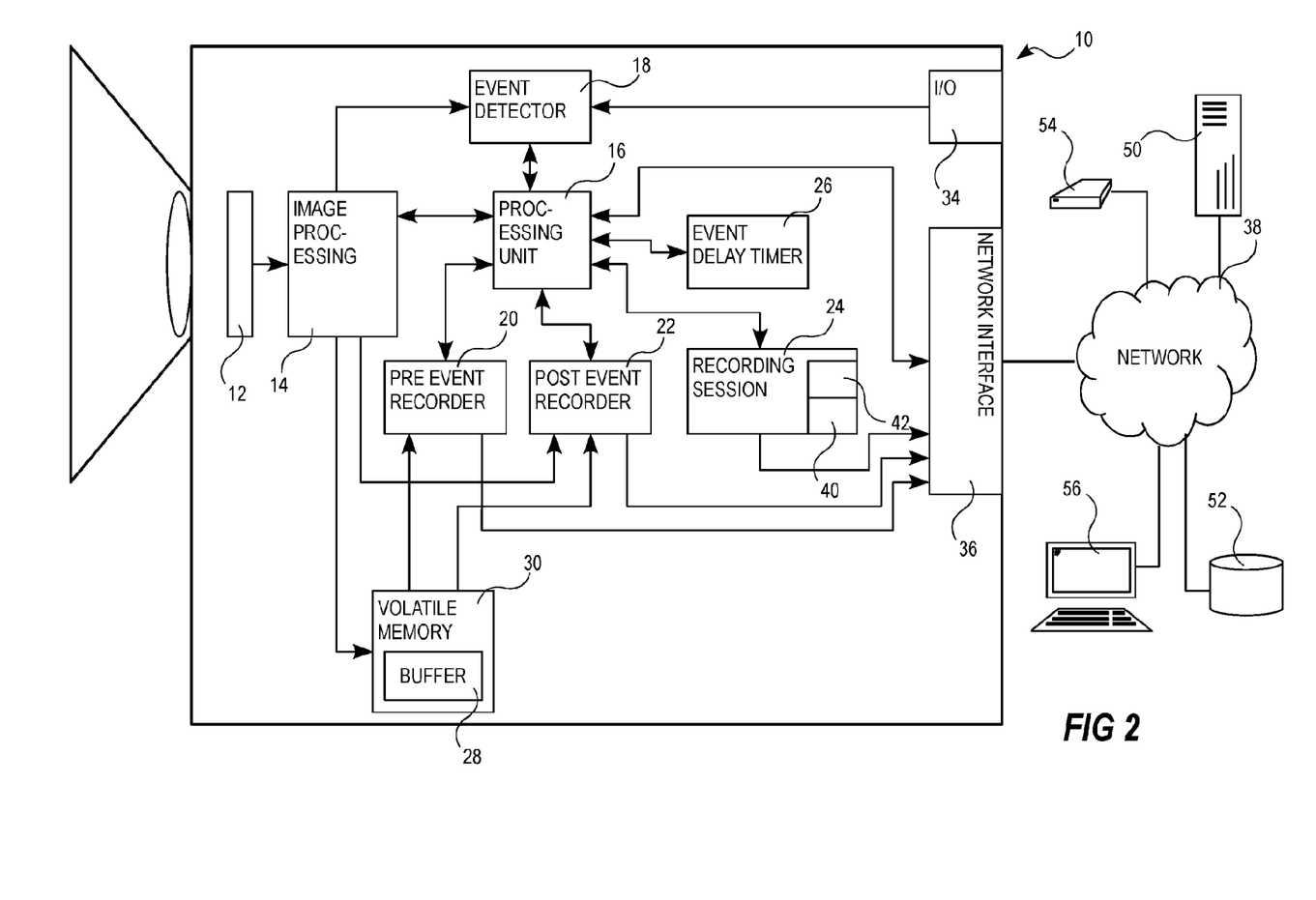
FIG. 2 is a schematic view of another embodiment of a video camera according to the invention.

According to another embodiment, see FIG. 2, the video camera 10 includes substantially the same features and means as the video camera 10 of FIG. 1. The difference between the embodiment of FIG. 2 and the embodiment of FIG. 1 is that the video sequence recording session processor 24 is arranged to initiate a recording at a storage device 50, 52, 54, 56 connected to the video camera 10 via the network 38. The storage device 50, 52, 54, 56 may, for example, be a server 50, a data base 52, a networked hard drive 54 or solid state drive 54, or a computer 56. Accordingly, the pre-event recorder 20 and the post-event recorder 22 are recording and communicating with a non-volatile memory at the storage device 50, 52, 54, 56 via the network interface 36 and the network 38.

The camera 10 may be arranged to detect only one type of event type or to detect a plurality of event types. An event type is to be understood as an event detected by means of a particular detection scheme (e.g., motion detection and temperature detection may be two different event types and a particular combination of detected motion and a particular temperature may be another event). Each event type is related to event type parameters, such as a number of pre-event frames #PrEF and number of post-event frames #PoEF for example.

According to one embodiment, each parameter indicating number of pre-event frames #PrEF may be based on a predefined or user defined value indicating the number of video frames representing a time period of interest before the occurrence of the event in real life and on a value indicating the number of frames representing latency when detecting the particular event. The latency represents the time it takes from the occurrence of the event until the event detector provide an event detection signal (i.e., the time period from the occurrence of the event to the detection of the event).

According to another embodiment, each parameter indicating #PrEF may be based on a value indicating the number of video frames representing a predetermined time period of interest before the occurrence of the event in real life and on a dynamic value indicating the number of frames representing latency when detecting the particular event. The latency is the actual time, measured by the system, it takes from the occurrence of the event until the event detector 18 provides an event detection signal (i.e., the time period from the occurrence of the event to the detection of the event).

Figure 3:
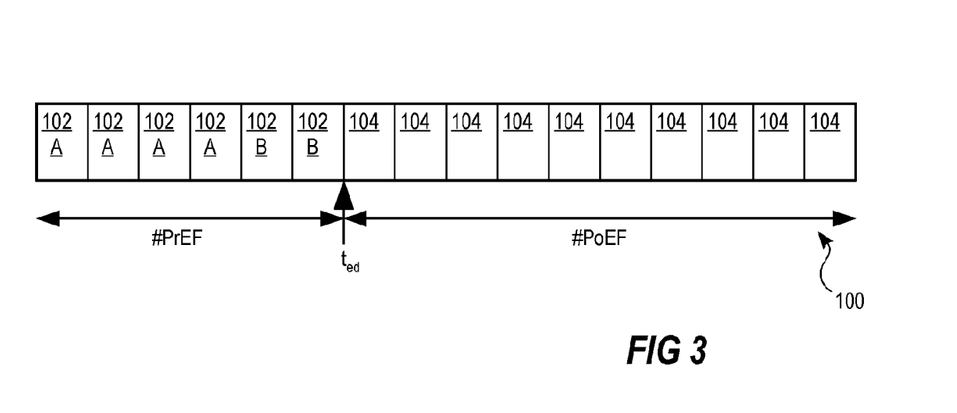
FIG. 3 shows an example structure of an event initiated video sequence.

Now referring to FIG. 3, the structure of a recorded event video sequence 100 representing a video of a single event may include a sequence of video frames 100; the number of frames presented in FIG. 3 is only selected in order to facilitate understanding of the structure of the video event sequence. The sequence of video frames 100 includes pre-event video frames 102, which are video image frames captured before a point in time $t_{ed}$, and post-event video frames 104 captured after the point in time $t_{ed}$, where $t_{ed}$ represents the detection of the event triggering the capturing of the event video sequence. The video frames A represent the time period of interest before the occurrence of the event, and the video frames B represent the latency from occurrence of event to detection of event.

According to one embodiment, the buffer size 28 is equal to the largest number of pre-event frames MaxPrEF of the all the event types in the camera. According to another embodiment, the buffer size 28 is at least equal to the largest number of pre-event frames of the all the event types in the camera.

By considering the latency of the event detection, as well as the time period of interest when determining the number of frames the event is required to record, it is possible to more accurately determine the minimal length of a pre-event time period. Thereby, it becomes possible to optimize the size of the buffer and the utilization of the volatile memory.

Figure 4:
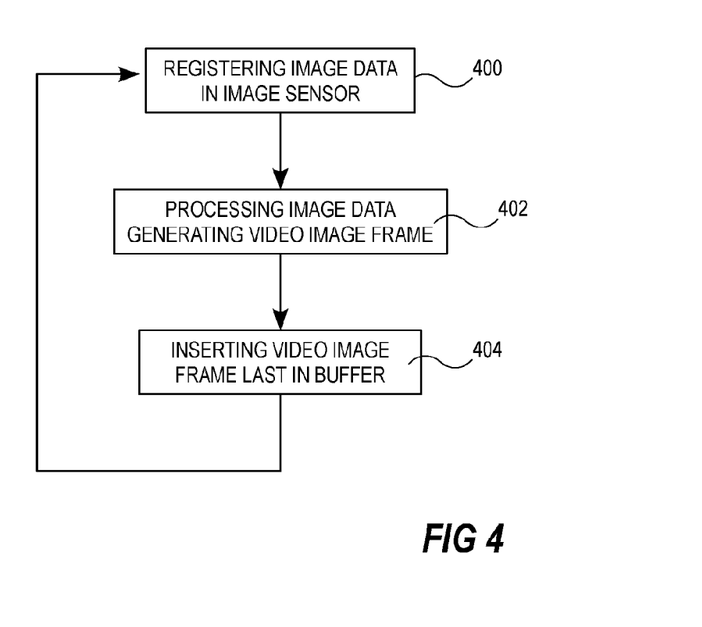
FIG. 4 shows a flowchart over a general process of capturing and buffering a video image sequence.
Figure 5A:
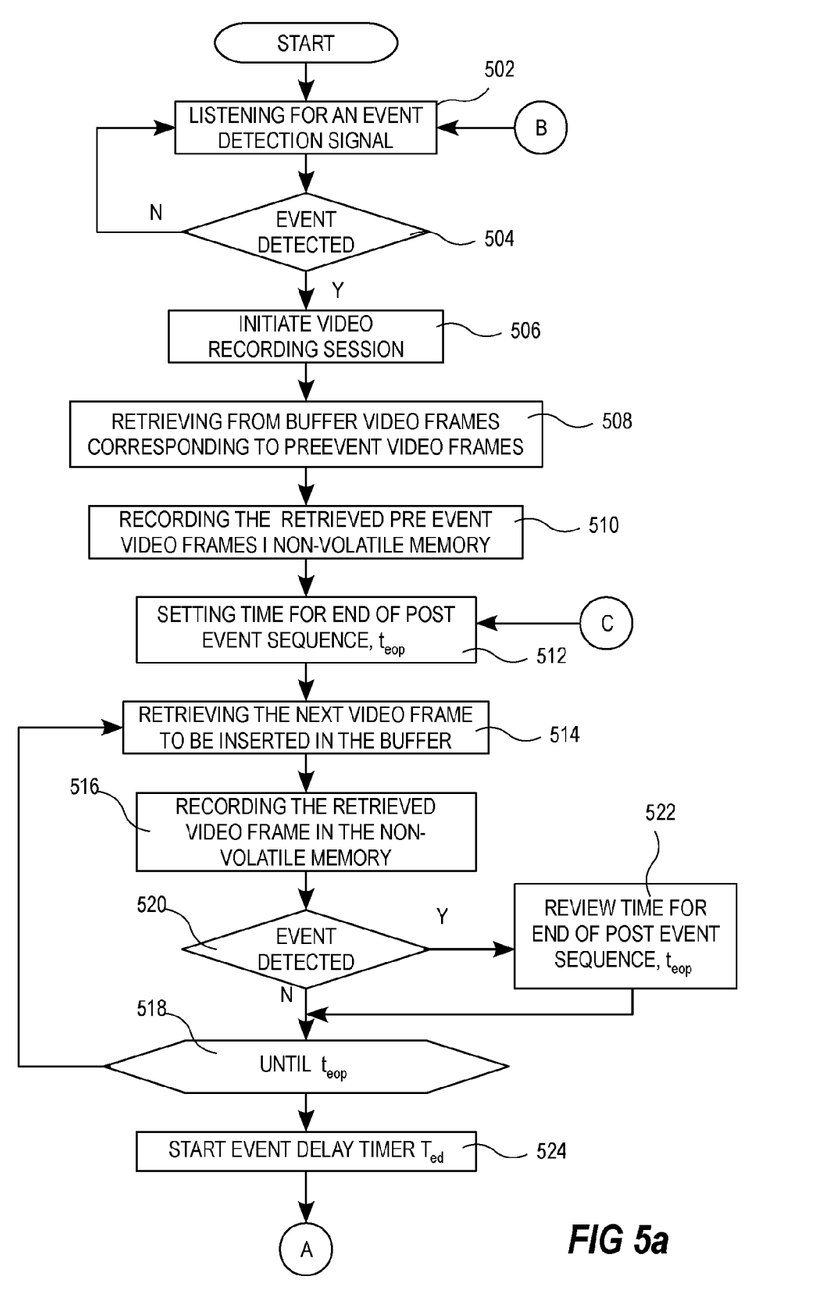
FIG. 5*a-b* show a flowchart over a method recording an event initiated video sequence according to one embodiment of the invention.
Figure 5B:
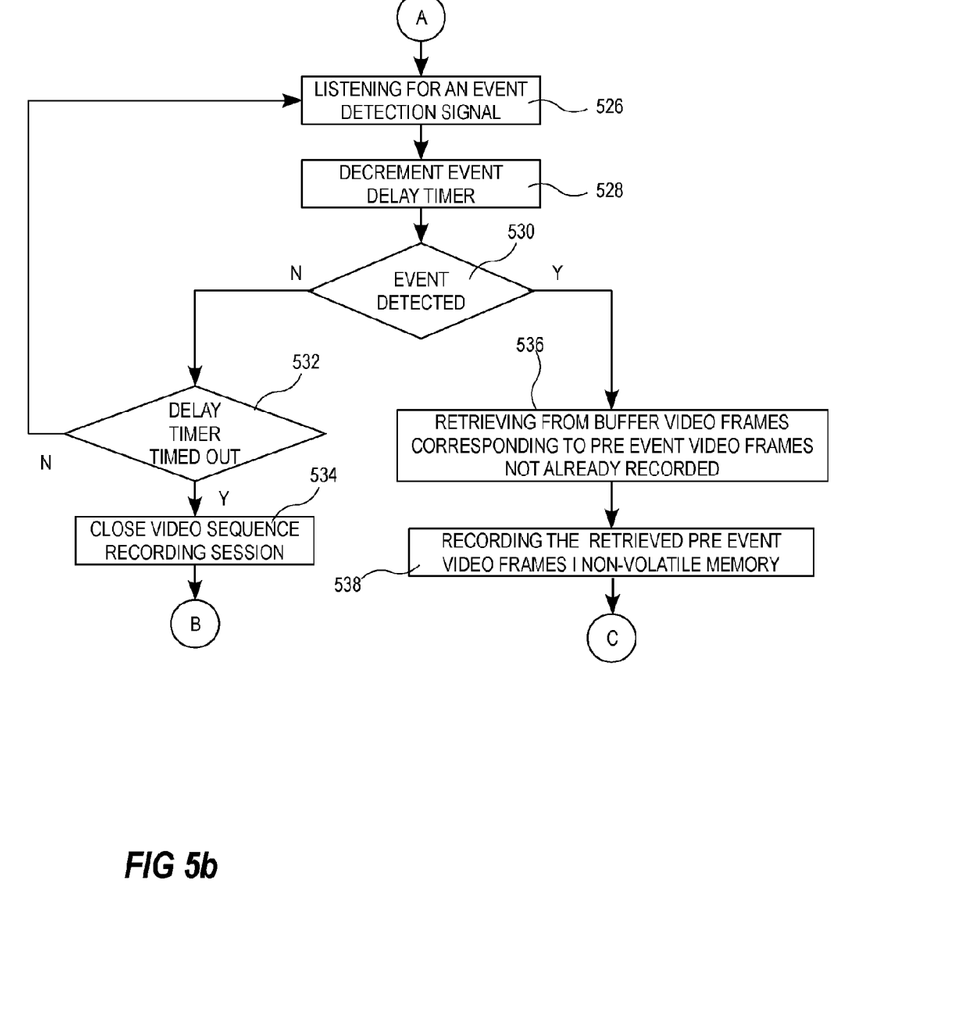

A method according to one embodiment for capturing and recording video sequences relating to an event is depicted by the flow charts of FIG. 4 and FIGS. 5*a*-5*b*. In FIG. 4, the general concept of capturing and buffering a video image sequence is illustrated.

The video camera 10 is directed for capturing video sequences of a scene. The image sensor 12 of the video camera 10 registers image data, step 400. The procedure and the way in which registration of image data in an image sensor is performed may vary depending on the type of image sensor 12.

The registered image data is then processed, step 402, by image processing means in order to generate a video image frame adapted to be positioned in the produced video sequence. The processing of image data may for instance include compression, white balancing, sharpening, adjustment of contrast, Bayer Interpolation, cropping, noise cancelation, etc.

The video image frame is then inserted as the last video image frame in the buffer 28, step 404.

The process of event controlled recording of video sequences is running parallel with the capturing of video image frames and may be based on following process. The process is arranged to listening for a signal indicating the detection of an event of interest, step 502 and 504. The process continues to listen until an event signal is detected.

When an event signal is detected a video sequence recording session is initiated, step 506, and a number of video frames is retrieved from the buffer 28, step 508. The number of video frames retrieved from the buffer corresponds to the number of pre-event video frames #PrEF the detected event requires. The number of pre-event video frames is, as discussed above, a value accessible by the processing unit 16. The value may be stored as a parameter of the event. The frames retrieved are, in one embodiment, a video frame sequence being of a length corresponding the number of pre-event video frames required and starting at the last video frame written to the buffer 28. This retrieved video sequence is then recorded in the non-volatile memory at step 510, in accordance with the initiated recording session. In connection with the event detection, an end of post-event time limit, $t_{eop}$, or a number of post-event frames limit, is set at step 512. It is not relevant if the limit is set in number of frames or as a time, so long as a distinct endpoint for post-event frames is provided. Some event types may not have a definite endpoint, in which case post-event frames are recorded as long as the event is in progress (e.g., as long as movement is present). The post-event time limit, $t_{eop}$, or another variable may indicate if this is the case.

The next video image frame, i.e., the video image frame outputted from the image processing unit 14 following the latest image frame for recording as pre-event image frames, is retrieved, step 514, and recorded in the non-volatile memory 32, step 516. The steps of retrieving the next image captured and recording the retrieved image, steps 514 and 516, is then repeated until the predetermined number of post-event video frames has been recorded or, if described using time, until the time limit $t_{eop}$ for the post-event sequence has expired, step 518. If the event is a type not having a definite endpoint the step 518 may be designed to repeat until the event no longer is in progress.

If a new event is detected, step 520, during the recording of the post-event video frames, the present post-event sequence time limit $t_{eop}$ is reviewed, step 522, by comparing it with a post-event sequence time limit $t'_{eop}$ resulting from the new detected event. If the post-event sequence time limit $t'_{eop}$ resulting from the new event expires later than the present post-event sequence time limit $t_{eop}$, the present post-event sequence time limit $t_{eop}$ is replaced with the post-event sequence time limit $t'_{eop}$ resulting from the new event. On the other hand, if the present post-event sequence time limit $t_{eop}$ still expires later than the new event time limit $t'_{eop}$, then the present post-event sequence time limit $t_{eop}$ is kept.

When the post-event sequence time limit $t_{eop}$ has expired and no more event video recordings are in progress, an event delay timer $T_{ed}$ is started, step 524. Now referring to FIG. 5b, as long as the event delay timer $T_{ed}$ has not expired the process is arranged to listen for an event detection signal, step 526, and decrement the event delay timer 26, step 528. During the running of the event delay timer 26, video image frames are written to the buffer 28. The event delay timer 26 has a length substantially equal to the largest predetermined number of pre-event frames related to the event type parameters of the video camera 10. If the video camera 10 is arranged to only detect one event type, then the predetermined number of pre-event frames of that event type represent the largest predetermined number of pre-event frames in the video camera 10.

If no event is detected, step 530, and the event delay timer 26 has not expired, step 532, then the process performs the steps of listening for an event detection signal and decrementing the event delay timer 26.

If no event is detected, step 530, and the event delay timer 26 has expired, step 532, then the process is arranged to close the video sequence recording session, step 534. Video image frames are still being written to the buffer 28. Then the process returns to steps 502 and 504 listening for an event signal.

If an event is detected, step 530, then it is detected before the expiration of the event delay timer 26 and thereby there is a chance that the pre-event video frames required by the detected event is temporally overlapped by the post-event video frames of the previous event recording. In the present embodiment, the process then retrieves from the video buffer 28, in response to detecting an event during the running of the event delay timer 26, all video frames buffered since the recording of post-event video frames ended, step 536, and records them in the present video sequence recording session, step 538. In other words, the process adds the video frames captured between the point in time when recording of previous event video was ended, i.e., after step 518, and the detection of the new event, step 530. Thereby a continuous video sequence including event video relating to more than one event is created and video from two different events is recorded without storing duplicate video frames.

Moreover, a post-event video frame recording identical to the post-event video frame recording for an event requiring a new video sequence recording session as described above may be used. Hence the process returns to setting the end of post-event time limit, $t_{eop}$, or setting the number of post-event frames, step 512, for the new event.

One advantage of the above method is that it is possible to use a small amount of volatile memory 30 for on-the-fly recording of video sequences related to events without excessive use of non-volatile memory 32. For example, only the video data of interest is recorded in non-volatile memory 32, thereby also making the non-volatile memory 32 last longer as many non-volatile memories has a limited number of possible write cycles for each memory cell. Another, advantage of this particular embodiment is that video frames of interest are recorded in non-volatile memory 32 as soon as they are available or as soon as the video camera 10 detects an event. This results from the fact that the video image frames are retrieved and recorded as soon they are available, i.e. directly from the output of the image processing device, and that pre-event video frames are retrieved and recorded directly from the buffer 28 without waiting for each of them to pass through.

Figure 6A:
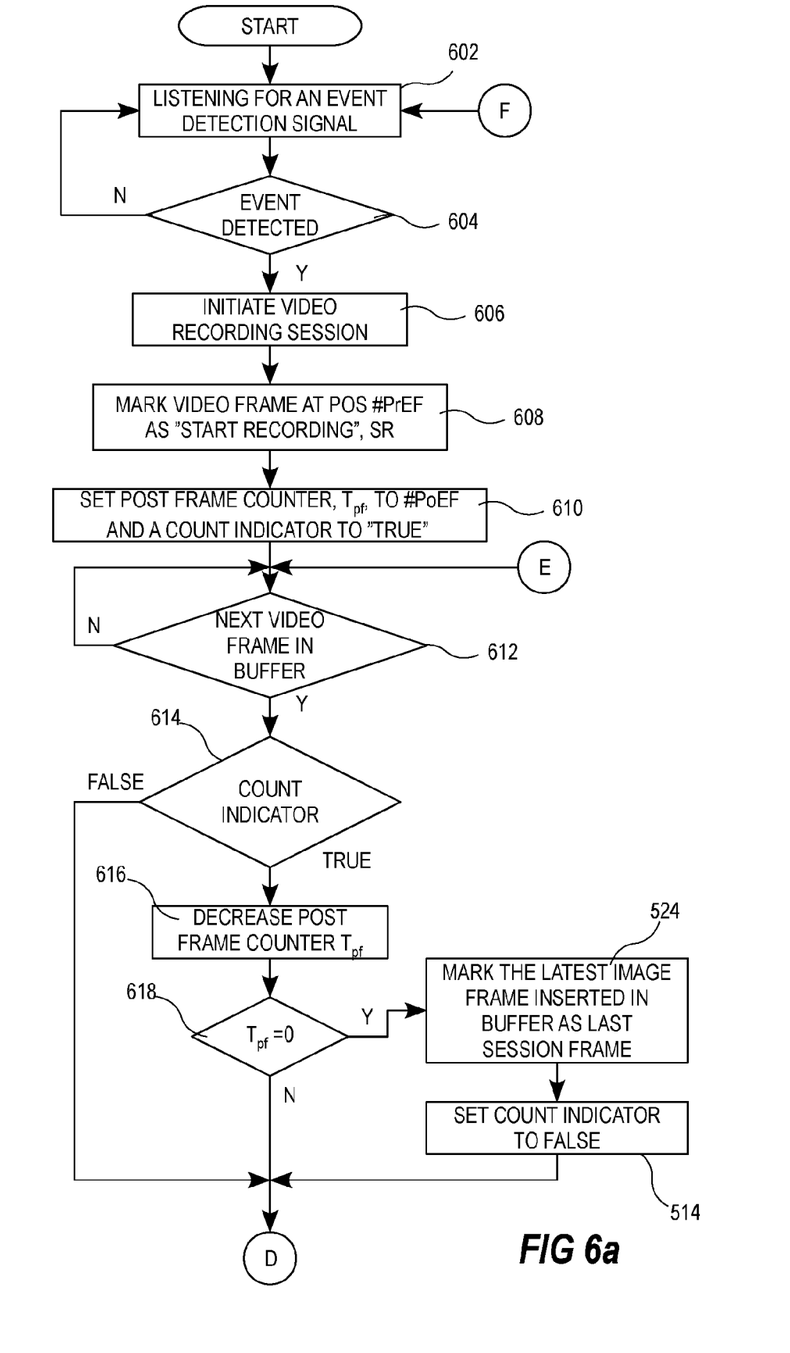
FIG. 6*a-b* show a flowchart over a method recording an event initiated video sequence according to another embodiment of the invention.
Figure 6B:
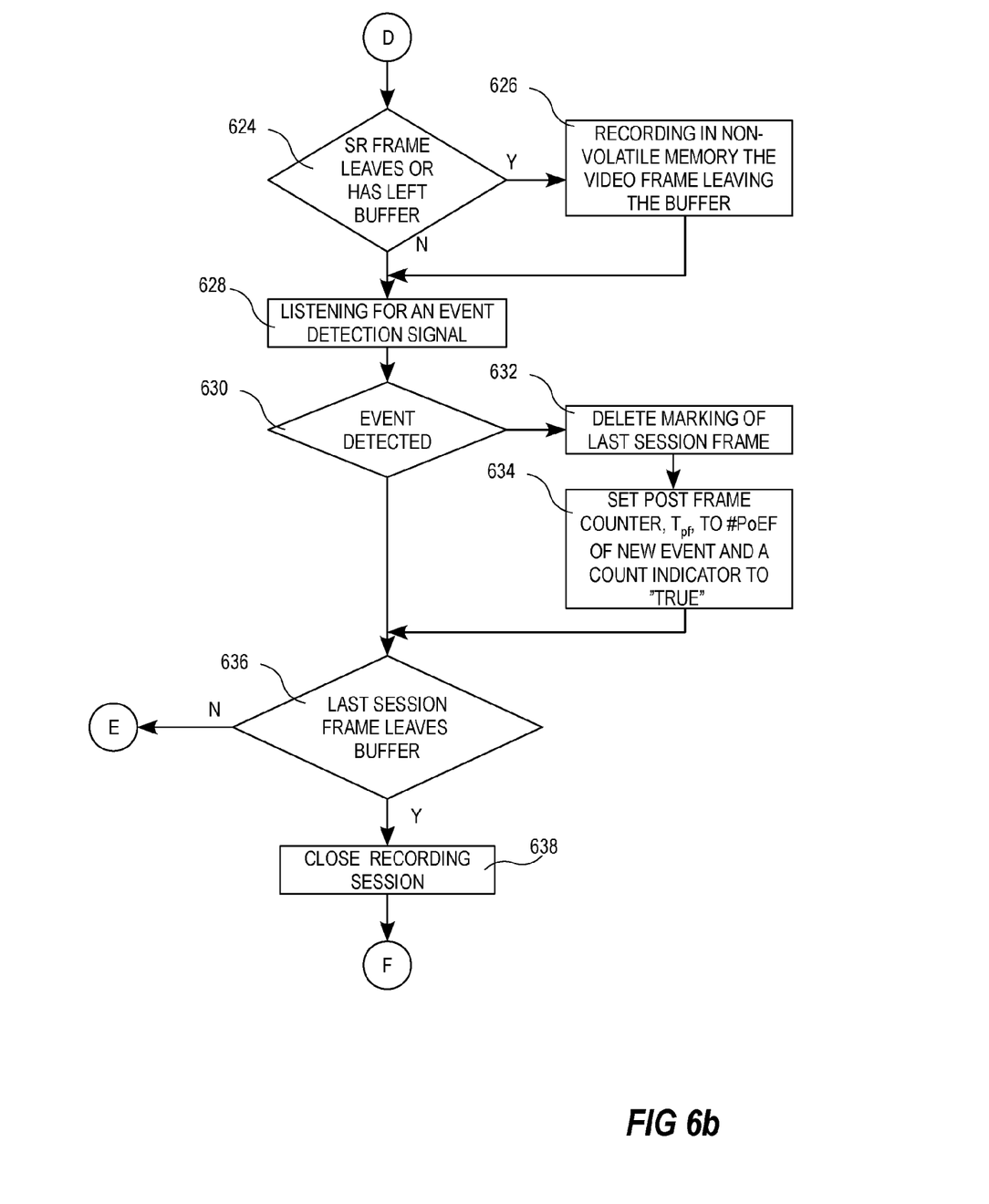

According to another embodiment, see FIGS. 6a-6b, the method corresponds to the method above with the exception that multiple video frames are not retrieved from the buffer at a time. The capturing of image data and generating video image frames described in FIG. 4 may also be applicable in this embodiment. In this method, the video frames from the image sensor 12 all are passing through the buffer 28 before recording. The buffer 28 is a FIFO buffer and the decision relating to recording image frames relay on a decision of whether the video frame outputted from the buffer 28 is to be recorded in the non-volatile memory 32 or not.

The process of event controlled recording of video sequences is running parallel with the capturing of video image frames and may be based on the following process. The process is arranged to listening for a signal indicating the detection of an event of interest, step 602 and 604. The process continues to listen until an event signal is detected.

When an event signal is detected, a video sequence recording session is initiated, step 506. Then the video image frame positioned at a position in the buffer 28 being the predetermined number of pre-event frames #PrEF from the last video frame inserted in the buffer is marked as a start recording frame, SR, step 608, i.e. the frame buffered #PrEF before the event detection is marked as a SR frame.

A post frame counter $T_{pf}$ is set to the value of the predetermined number of post-event frames #PoEF and a count indicator is set to TRUE, step 610, in order to keep track of the video image frame that are to be the last of this particular event. The count indicator indicates, when TRUE, that the last video image frame of the post-event sequence has not yet been captured and inserted into the buffer 28. When the count indicator is FALSE, the last video image frame of the post-event image frames is present in the buffer 28. Now when the first video image of the event has been inserted in the buffer 28 and the earliest pre-event frame has been marked, the process waits for next video image frame to be inserted in the buffer 28, step 612.

When the next video image frame is inserted, the process checks if the count indicator is TRUE or FALSE, step 614. If the count indicator is FALSE, i.e. the last video frame of the post-event frames has been inserted in the buffer 28 and the post frame counter is not supposed to count any more, then the process skips all steps relating to finding the last post-event frame and proceeds directly to step 624. If the count indicator on the other hand is TRUE, then the process still looks for the last post-event frame, and the post frame counter $T_{pf}$ is decreased, step 616. The post frame counter $T_{pf}$ may be decreased by the value of one or any other value, as long as the counting of frames leads to finding of the last post-event frame.

The value of the counter is checked, step 618, in order to find out if it has reached a count indicating that the image video frame newly inserted in the buffer is the last post-event frame. According to one embodiment, this is indicated by the counter when it has reached zero. If the last post-event frame has not been inserted in the buffer and the post then the process continues to step 624. However, if the last post-event frame has been inserted in the buffer, e.g. the counter $T_{pf}$ has reached zero, then the latest video image frame inserted in the buffer is marked as being the last session frame, step 620, and the count indicator is set to FALSE, step 622, and the process continues to step 624.

In step 624, the process checks if the start recording (SR) frame has reached the end of the buffer and is leaving the buffer, or if the SR frame has left the buffer earlier. If the SR frame is leaving or has left the buffer, the video image frame leaving the buffer is recorded in non-volatile memory 32, step 626. Then the process proceeds to step 628 for listening for an event detection signal.

If the SR frame is not leaving or has not left the buffer, then the process proceeds to step 628 for listening for an event detection signal.

If an event detection signal is detected, step 630, at this stage of the process it means that pre-event image frames or post-event image frames of a previously detected event are advancing through the buffer to be recorded in the non-volatile memory 32. Because the length of the buffer corresponds substantially to the maximal number of pre-event frames of a single event, an event that is detected during this time period is likely to have video image frames overlapping or being very close in time to the image frames of the previously detected event. Accordingly, these video frames should be recorded in the same recording session in order not to create an excess of data or writing cycles. In order to achieve this, the marking of a last session frame is deleted, if such frame has been marked yet, step 632. Then the post frame counter $T_{pf}$ is set to a value corresponding to the number of post-event frames of the new event and the count indicator is set to TRUE, step 634. Thereby the process will find a new last session frame, which is related to the new event, and the process continues recording the frames exiting the buffer 28 in non-volatile memory 32. When these procedures are finished, the process continues to step 636.

If no event is detected in step 630, then the process continues to step 636 in which the process checks if the frame marked as the last session frame is leaving the buffer 28.

If the frame marked as the last session frame is recorded and, thus, is leaving the buffer 28, then the recording session is closed and the process returns to step 602 waiting for detection of a new event. Otherwise, if no frame marked as last session frame is found leaving the buffer 28, then the process returns to step 612 waiting for the next video frame to be buffered.

In this embodiment, the buffer 28 itself acts as a delay channel or a timing buffer in order to make sure that the recording session is not closed until it is certain that no overlapping pre-event frames may be the result of a detection of a new event.

It is possible to add an override functionality relating to the marking of the last session frame in cases of events not having a definite endpoint, as described in the embodiment depicted in FIGS. 5a-b. This override should enable recording of post frames as long as such event is active and stop recording post frames if such event is no longer active and no post frame counter is counting for an event having a fixed number of post-event frames.

In the above embodiments of the method, it is described that if a new event is detected when event frames from previous event are still captured, then the time for end of the post-event sequence or the number of frames left until the last session frame is captured changes in order to record both events in the same recording session. Further, if the new event is detected after the time for end of the post-event sequence has expired, or after the last session frame has been captured, and the time between the expiration or the capture of the last session frame and the first pre-event frame requested by the new event are overlapping, then the process is arranged to record the video image frames of the new event in the same session and to continue adding video image frames to the sequence of the previous event. However, there is a case when the number of pre-event image frames requested by the new event is smaller than the maximum number of pre-event image frames defined in the system and the temporal distance between the detection of the new event and the last frame of the earlier event is greater than the time corresponding to the number of pre-event image frames requested by the new event. Hence, the buffer will include video image frames not requested by any event. This situation may be handled in a couple of ways. One way to handle it is to determine that all new events detected within the time corresponding to the maximum number of pre-event image frames is incorporated in the earlier session even if video image frames not requested will be recorded. Another way to handle it is to check when the new event is detected if the buffer includes video image frames not requested by any event. If video image frames not requested are found, the previous recording session is ended at the last video image frame of the earlier event and a new recording session is started for the new event.

Figure 7A:
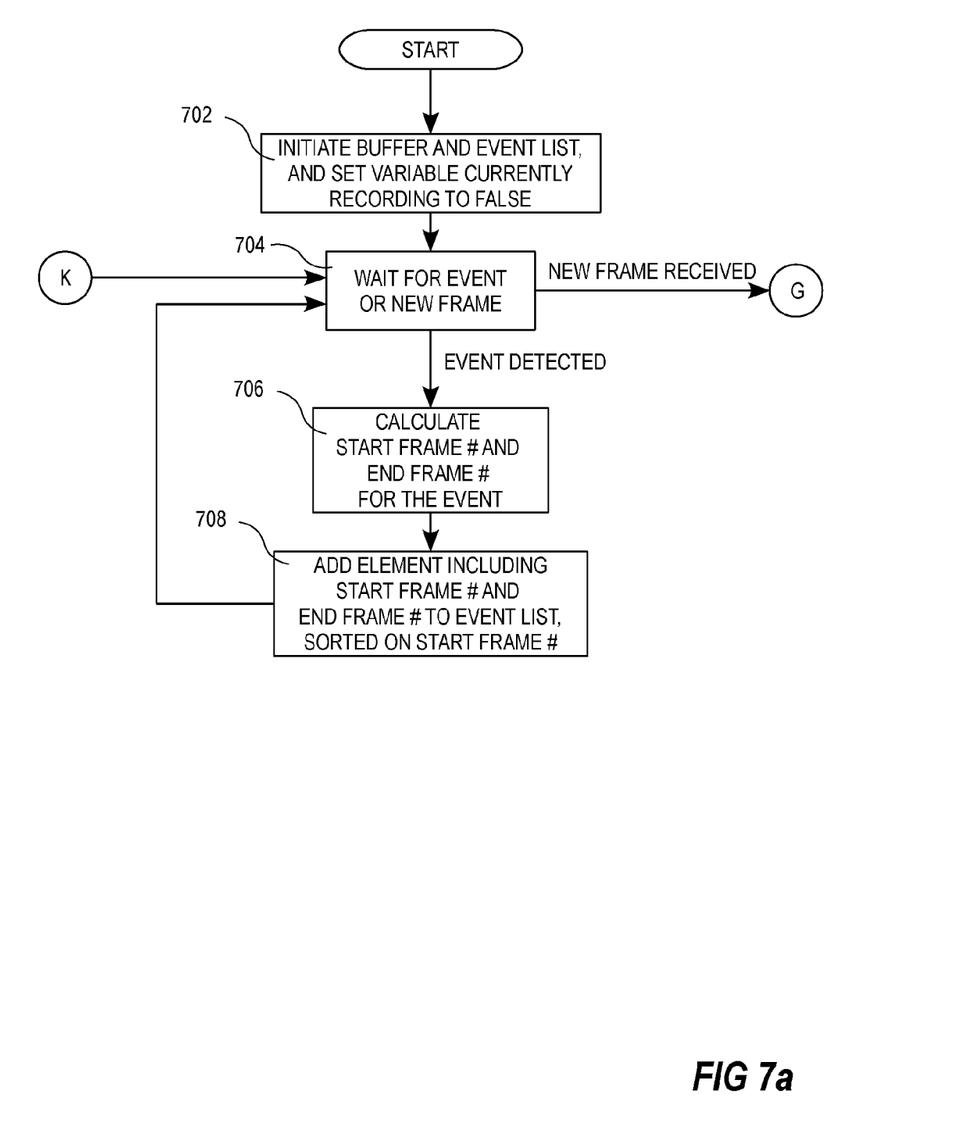
FIG. 7*a-c* show a flowchart over a method recording an event initiated video sequence according to yet another embodiment of the invention.
Figure 7B:
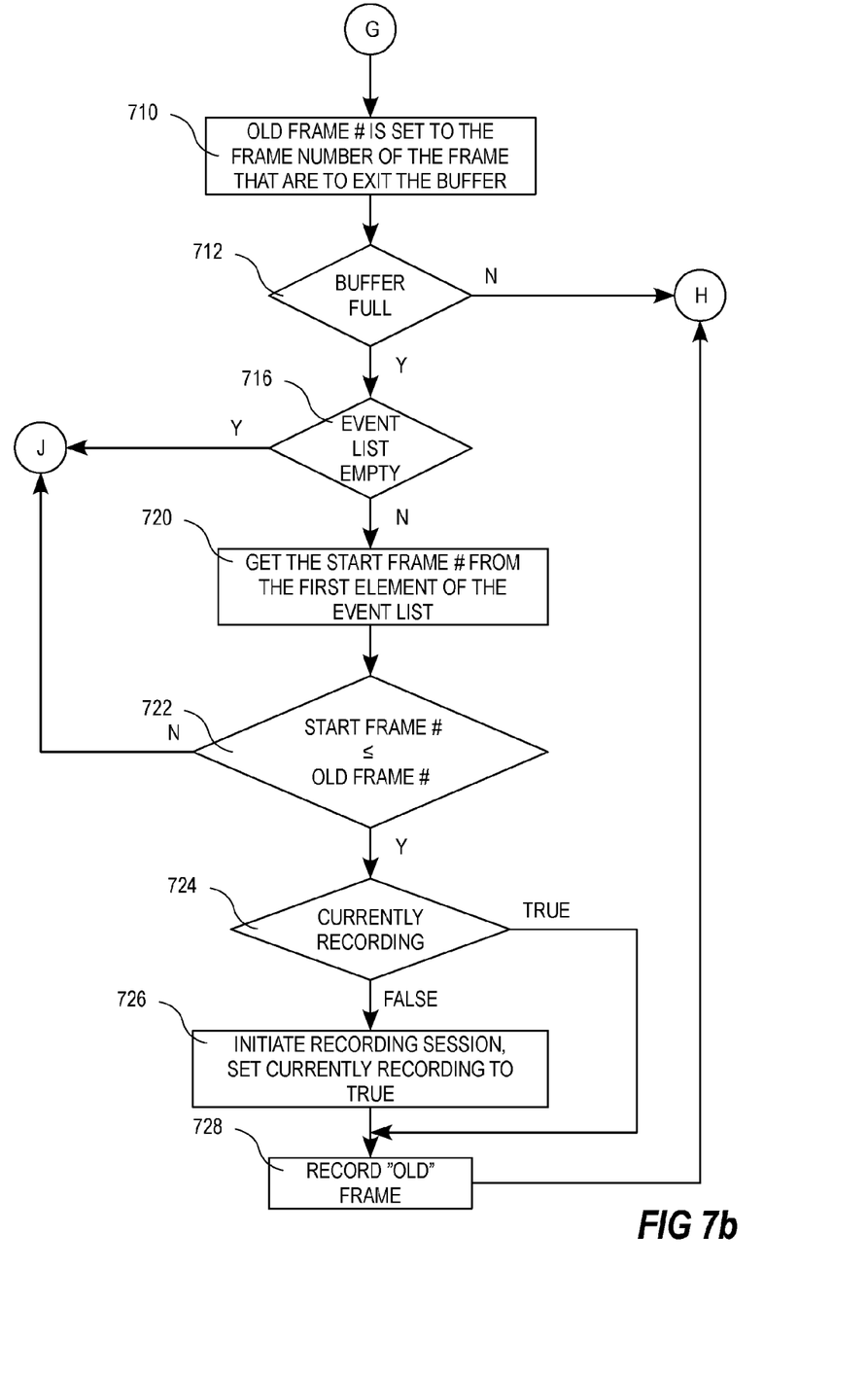
Figure 7C:
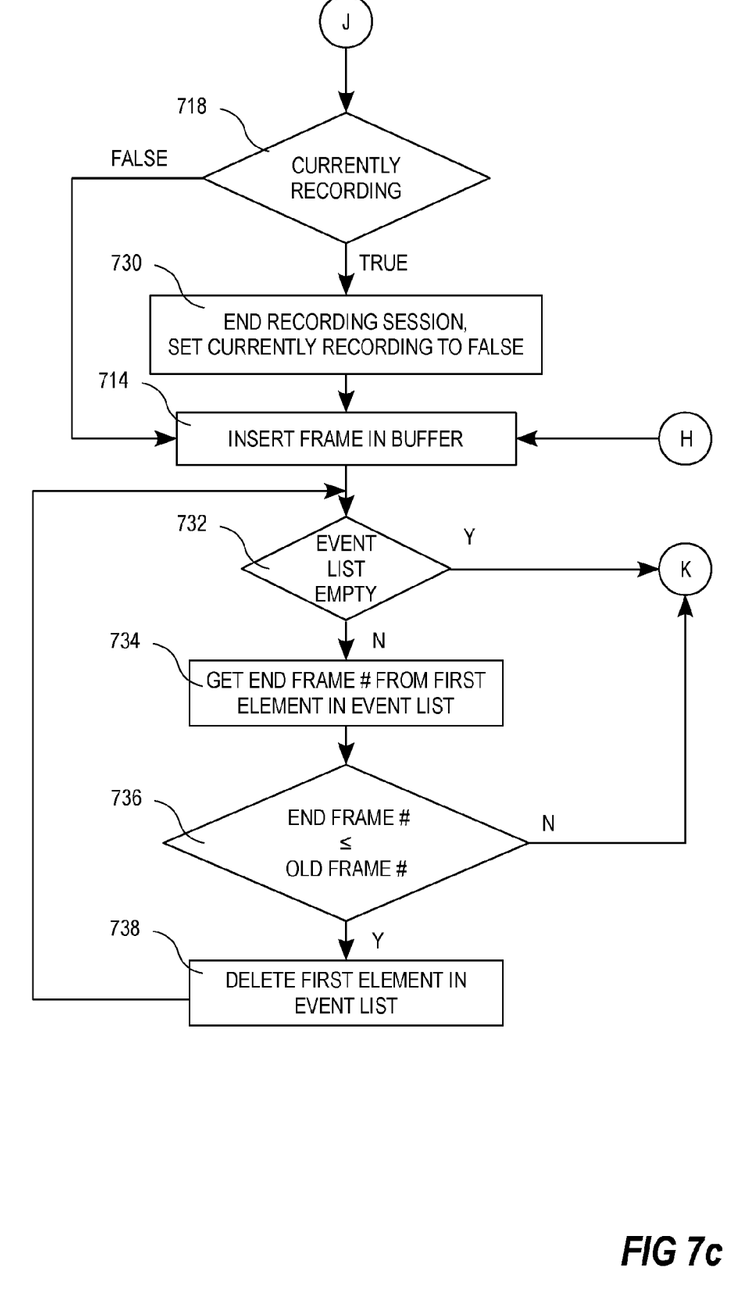

According to yet another embodiment as shown in FIGS. 7a-7c, the process of handling events is started, the buffer and an event list is initiated, and a variable "Currently Recording" is set to FALSE, step 702. The event list may be a self-balancing binary search three, e.g., AA tree, AVL tree, Red-black tree, Scapegoat tree, Splay tree, Treap, etc. The evident advantage of using such a structure for this particular list is that adding and sorting new elements will be fast.

Then the process waits for an event to be detected or a new frame to be captured, step 704.

If an event is detected, the process calculates a start frame number, and an end frame number for the event, step 706, using the parameters of the detected event. These parameters may be, as previously described, the number of pre-event frames, the number of post-event frames, and latency, where the start frame number and the end frame number are values identifying these particular frames. The detection of an event, step 706, may also trigger sending of some kind of alarm, indication or the like. A new element may then be added to the event list, step 708. The element includes at least the start frame number and the end frame number and the list is, in this particular embodiment, sorted on start frame number, in order to increase the search speed. When the event has been added, the process returns to step 704 and waits for a new event or a new frame.

If, in step 704, a new frame is detected the process proceeds to step 710, and sets a variable "Old Frame Number" to the frame number of the frame that is to exit the buffer in response to the new frame being inserted. This Old Frame Number variable is used to determine if the process is to start recording or end recording and may be set to a specific value if buffer is not full, (e.g., a negative value). Then the process checks if the buffer is full, step 712. If the buffer is not full, the process proceeds to step 714 inserting the frame into the buffer 28 and proceeds with the steps of the process following step 714. If the buffer 28 is full, then the process checks if the event list is empty, step 716. If the event list is empty, the process continues to step 718.

However, if the event list is not empty, the start frame number of the first element in the sorted event list or the element with the lowest start frame number in a non-sorted event list is retrieved, step 720. If this start frame number is not equal to and not less than the variable Old Frame Number, then the frames corresponding to the start frame number have not reached the end of the buffer, and the process proceeds to step 718 to process this situation. If, on the other hand, the start frame number is equal to or less than variable Old Frame Number, then the process continues to check if a session is currently recorded. This is performed by means of checking if the variable Currently Recording is TRUE or FALSE in step 724. If FALSE, the process initiates the recording session and sets the Currently Recording variable to TRUE, step 726, and then the process records the "old" frame, (i.e., the frame exiting the buffer), step 728. If the check at step 724 discovers that the process is currently recording in a recording session, then the process goes directly to recording the "old" frame, step 728. When the frame has been recorded, the process proceeds to step 714 and inserts frame in buffer.

The check 718 relating to whether the process is currently recording or not is performed at step 718. This particular check is performed in response to the event list being empty, step 716, or in response to the start frame number not being equal to or less than the variable Old Frame Number, step 722, and is performed in order to determine whether a recording session is to be ended or not. If the variable Currently Recording is FALSE in step 718, then there is no recording session to end, and the process inserts the frame in the buffer, step 714. If the variable Currently Recording is TRUE in step 718, then the process ends the ongoing recording session and sets the variable named currently recording to FALSE, step 730. Then the process inserts the frame in the buffer, step 714. After the insertion of the frame in the buffer, a check is performed in the event list, step 732. If the event list is empty, the process returns to step 704 waiting for a new frame or a new event. Otherwise, if the event list is not empty, the process retrieves the end frame number of the first element in the sorted event list or of the element with the lowest start frame number in a non-sorted event list, step 734, and checks if the end frame number is less than or equal to the value of the variable Old Frame Number. If the end frame number is less than or equal to the value of the variable Old Frame Number, then the first element of the event list is obsolete and is therefore deleted, step 738. Then the process returns to checking if the event list is empty, step 732, in order to check if additional events may be deleted. However, if the end frame number is not less than and not equal to the value of the variable Old Frame Number, step 736, then the first element of the event list is still relevant, and the process returns to step 704 waiting for a new event or a new frame.

This process, described referring to FIGS. 7a-c, may also implement events not having a definite endpoint. The only difference in such implementation is that the recording session is not allowed to end as long as such event not having a definite end point is in progress. This may be indicated by setting the end frame number of the event to a special value, e.g. a negative value. When the end of such an event is detected, the end frame number is set. Thereby, the process may record post-event relating to events having a predetermined post-event length and events that are to be recorded for the entire time the event is indicated as active.

Yet another embodiment may include the functionality of the embodiment described in FIGS. 7a-c, except for the use of the variable Currently Recording and the functionality of steps 724, 726, 718, and 730. The operation of such a process is identical to the operation as described in relation to FIGS. 7a-c above except that no recording sessions are initiated or ended.

All the processes described above, referring to FIGS. 4, 5a-b, 6a-b and 7a-c, may be implemented in a video camera. The skilled person realizes that the implementation may be in the form of software or by means of logic circuits.

What is claimed is:

1. Method for recording an event initiated video sequence, the method comprising:
   continuously capturing video frames;
   temporarily storing video frames in a video buffer;
   detecting a first event;
   initiating, in response to the detection of the first event, a video sequence recording session for recording of a video sequence in a non-volatile memory;
   recording, in response to the detection of the first event, in the non-volatile memory, pre-event frames of the captured video data present in the buffer;
   recording, in the non-volatile memory, post-event frames of the video data captured during a post-event time period related to the first event, the post-event time period starting at the detection of the first event;
   starting a first event delay time period in response to the expiration of the post-event time period of the first event;
   detecting a second event after expiration of the post-event time period of the first event and before expiration of the first event delay time period;
   recording, in response to detection of the second event, in the non-volatile memory, frames from the video buffer representing a time period starting at the expiration of the post-event time period of the first event and ending at the detection of the second event;
   recording, in the non-volatile memory, frames of the video data captured during a post-event time period related to the second event, the post-event time period starting at the detection of the second event; and
   closing the video sequence recording session if a delay period expires and no other event process is in progress, wherein an event process includes recording pre-event frames, recording post-event frames, and an event delay time period, and wherein the delay period is a period counted from the expiration of a post-event time period.

2. Method according to claim 1, wherein the size of the video buffer substantially corresponds to the predetermined number of pre-event frames.

3. Method according to claim 2, wherein the number of pre-event frames to be recorded is defined by at least two parameters, wherein the first parameter is an arbitrary value defining the desired amount of video preceding the event and the second parameter is a latency period corresponding to the time difference between an occurrence of an event and a detection of the same event.

4. Method according to claim 1, wherein the video buffer is a First In First Out type.

5. Method according to claim 1, wherein the initiating a video sequence recording session comprises setting up a file in the non-volatile memory to include the recorded video session and wherein the closing the video sequence recording session comprises closing the file.

6. Method according to claim 1, wherein the capturing video frames, the temporarily storing video frames in a video buffer, the detecting a first event, the initiating a video sequence recording session, the recording pre-event frames of the first event, the recording post-event frames of the first event, the detecting a second event, the recording pre-event frames of the second event, the recording post-event frames of the second event, and the closing the video sequence recording session, are all performed at a camera.

7. Method according to claim 1, wherein the non-volatile memory is arranged in a camera.

8. Method according to claim 1, wherein the buffer is arranged in a camera and the non-volatile memory is arranged in a device connecting to the camera via a network, and wherein the initiating a video sequence recording session comprises setting up a video stream over the network and a file in the non-volatile memory to transfer the video stream over the network and storing the recorded video session in the file, and wherein the closing the video sequence recording session comprises the act of closing the file and the video stream.

9. Method according to claim 1, wherein a detected event is one event type of a plurality of event types and wherein the method further comprises indicating the event type of any detected event and retrieving values specifying the predetermined number of pre-event frames the predetermined number of post-event frames of the indicated event type.

10. Video camera arranged for event initiated recording of video sequences, the video camera comprising:
   an image sensor arranged to continuously capture video frames;
   a video buffer arrange to temporarily store video frames;
   an event detector;
   a video sequence recording session initiator arranged to initiate, in response to a detection of a first event, a video sequence recording session for recording of a video sequence in a non-volatile memory;
   a pre-event recorder arranged to record, in response to the detection of the first event, in the non-volatile memory, a number of pre-event frames of the captured video data present in the buffer;
   a post-event recorder arranged to record, in the non-volatile memory, post-event frames of the video data captured during a post-event time period related to a detected event, the post-event time period starting at the detection of the first event and ranging a number of post-event frames;
   an event delay timer arranged to time an event delay time period starting at a point in time of an expiration of a post-event time period;
   wherein the pre-event recorder is further arranged to record, in response to the detection of a subsequent event within the event delay time, in the non-volatile memory, frames from the video buffer representing a time period starting at the expiration of the post-event time period of the event and ending at the detection of the subsequent event; and
   a video sequence recording session closer arranged to close the video sequence recording session if a delay period expires and no other event process is in progress, wherein an event process includes recording pre-event frames, recording post-event frames, and an event delay time period.

11. Video camera according to claim 10, wherein the size of the video buffer substantially corresponds to a maximal number of pre-event frames.

12. Video camera according to claim 11, wherein the number of pre-event frames is defined by at least two parameters, wherein the first parameter is an arbitrary value defining the desired amount of video preceding the event and the second parameter is a latency period corresponding to the time difference between an occurrence of an event and a detection of the same event.

13. Video camera according to claim 10, wherein the video buffer is a First In First Out type.

14. Video camera according to claim 10, wherein the video sequence recording session initiator is further arranged to set up a file in the non-volatile memory to include the recorded video session and wherein the video sequence recording session closer is further arranged to close the file.

* * * * *